F. A. STEWART.
BEARING FOR FAST RUNNING WHEELS.
APPLICATION FILED SEPT. 4, 1914.
1,161,905.
Patented Nov. 30, 1915.
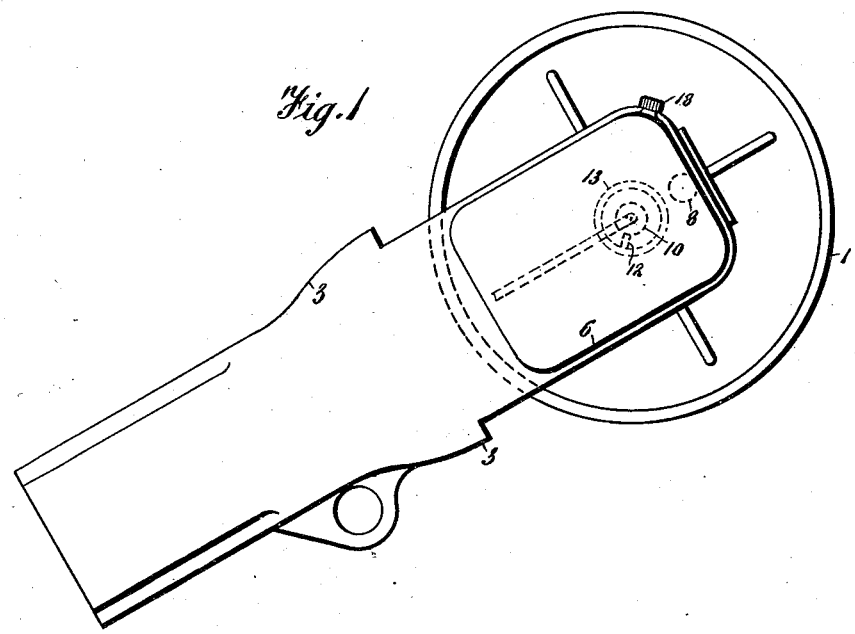
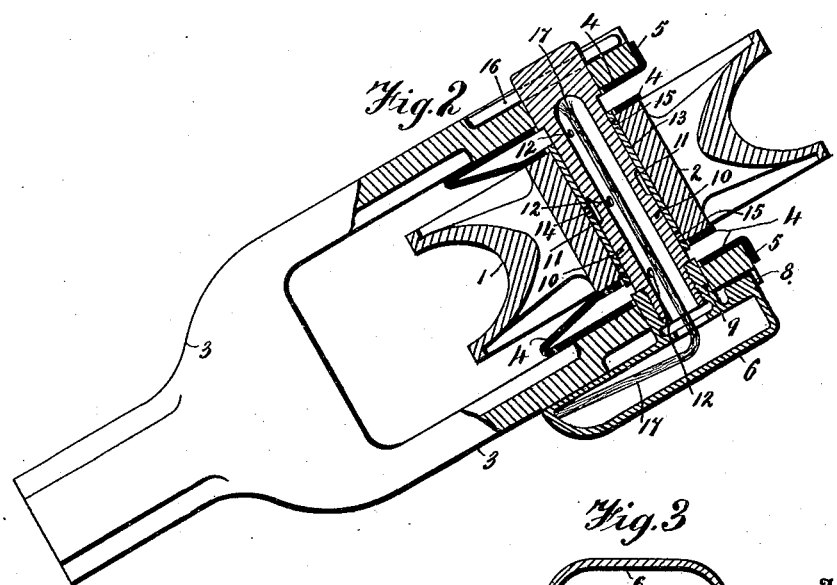
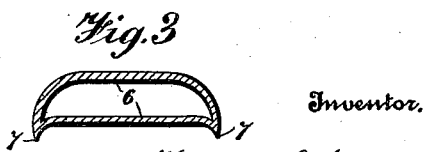
Witnesses
Gertie Nicholson,
J. Smith.
Inventor.
Francis A. Stewart
By
Alfred J. Bratton
Attorney.

UNITED STATES PATENT OFFICE.

FRANCIS A. STEWART, OF HAMILTON, ONTARIO, CANADA, ASSIGNOR OF ONE-HALF TO WILLOUGHBY ELLIS, OF HAMILTON, ONTARIO, CANADA.

BEARING FOR FAST-RUNNING WHEELS.

1,161,905.

Specification of Letters Patent. Patented Nov. 30, 1915.

Application filed September 4, 1914. Serial No. 860,217.

*To all whom it may concern:*

Be it known that I, FRANCIS ALEXANDER STEWART, of the city of Hamilton, in the county of Wentworth, Province of Ontario, Dominion of Canada, have invented certain new and useful Improvements in Bearings for Fast-Running Wheels, of which the following is a specification.

My invention relates to bearings for fast running wheels and more particularly to trolley wheels for electric railroads and the object of the present invention is to devise a bearing in which centrifugal force tends to aid the passage of the lubricant to the bearing surfaces.

A further object is to provide for lateral yielding of the wheel as it passes around curves in the trolley wire and yet insure the wheel redeeming its initial position in its bearing after the curve has been passed.

My invention consists of a wheel, a central axle extending therethrough and having an axial oil passage communicating with an oil reservoir, radial oil passages through the wall of the axle, a slidable and rotatable sleeve on the axle and spring plates bearing on the sides of the wheel, all as hereinafter more particularly described and illustrated by the accompanying drawings, in which:—

Figure 1 is a side elevation of a trolley wheel for electric railroads incorporating my improvements. Fig. 2 is an axial longitudinal section of the same. Fig. 3 is a cross section of the oil reservoir.

1 is the trolley wheel proper. 2 is the hub thereof.

3 is the harp which is of the usual pattern.

4, 4 are contact spring plates carried between the harp and the wheel. These plates are folded over, substantially in U-shaped formation, the outer limbs being formed with turned over ends which engage the outer ends of the fork 3 and the axle passes through central holes therein.

6 is a lubricant reservoir constructed in cross section as shown in Fig. 3, the longitudinal edges 7, 7 engage the sides of the fork 3 and prevent lateral displacement.

8 is a stop which fits into one of the inserts for the usual split pins.

9 is a bushing formed integral with the reservoir 6.

10 is a hollow spindle or axle which is tightly threaded into the bushing 9.

11 is a central reduced part on the axle 10.

12 are radial oil passages through the axle walls.

13 is a slidable and rotatable bushing, the length of which is somewhat less than the distance between the inside faces of the harp.

14 is a central hole through the bushing 13.

15, 15 are holes near the outer ends of the bushing 13 and diametrically opposite the hole 14.

16 is a split pin for securely retaining the axle 10 in position.

17 is a feed wick from the reservoir 6 to the interior of the axle 10.

18 is a cap for the reservoir 6.

Hitherto wheels of this type have been constructed with the lubricant carried in the wheel. In this construction the action of centrifugal force tends to draw the lubricant away from the bearing surfaces. In my invention, however, this is overcome and since the lubricant is carried in the interior of the axle centrifugal force tends to carry the same to the bearing surface.

A great disadvantage in former wheels has been the excessive escape and throwing of lubricant upon surrounding objects. This is overcome by my invention as the rotation and constant axial displacement of the bushing 13 on the fixed axle 10 causes the lubricant to be most effectively distributed. Further the reduced part 11 acts as a reservoir and assists in the lubrication.

It has been customary in wheels of this type to rivet the contact spring plates 4 to the harp. By this construction removal of the same was costly and occupied considerable time. In my invention these plates are simply inserted into place and are in no way rigidly fastened to the harp. The axle passes through holes in the plates while the outer limbs of the plates engage the outer ends of the harp. By this construction replacement of the plates is very simply and cheaply accomplished.

A further advantage of my invention is the degree of lateral movement allowed to the wheel. This is very essential when the wheel is passing around curves in the trolley wire and is a decided improvement over former wheels.

In my device while the wheel is free to move laterally the action of the spring contact plates constantly tends to return it to its central position.

Many modifications may be made in my invention without departing from the spirit of the same or the scope of claims and the form shown is to be taken as illustrative and not in a limiting sense.

What I claim as my invention is:

1. In a fast running wheel, in combination, an axle suitably supported at its ends and having a hollow interior partially of the length thereof, a rotatable bushing having lateral freedom on the axle, the axle and bushing having oil passages therethrough, a rotating element bearing on the bushing and having lateral freedom thereon, spring plates detachably mounted between the axle supporting arms and the rotating element, the said spring plates having outwardly extending limbs engaging the ends of the axle supporting arms, and means for supplying lubricant to the interior of the axle.

2. A spring plate adapted to be inserted between a rotating element and its axle supporting forks, consisting of an outer limb having its end portion turned over so as to engage the end of the fork, an inner limb extending substantially parallel to the outer limb, the inner and outer limbs having holes through which the axle is adapted to pass.

In witness whereof I have hereunto set my hand in the presence of two witnesses.

FRANCIS A. STEWART.

Witnesses:
GERTIE NICHOLSON,
ALFRED T. BRATTON.

Copies of this patent may be obtained for five cents each, by addressing the "Commissioner of Patents Washington, D. C."